(12) United States Patent
Boeck et al.

(10) Patent No.: US 9,834,251 B2
(45) Date of Patent: Dec. 5, 2017

(54) METHOD FOR STEERING A VEHICLE

(71) Applicant: Robert Bosch GmbH, Stuttgart (DE)

(72) Inventors: Martin Boeck, Neunkirchen (AT); Andreas Kugi, Vienna (AT); Patrik Zips, Vienna (AT)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 14/912,560

(22) PCT Filed: Aug. 14, 2014

(86) PCT No.: PCT/EP2014/067406
§ 371 (c)(1),
(2) Date: Feb. 17, 2016

(87) PCT Pub. No.: WO2015/028316
PCT Pub. Date: Mar. 5, 2015

(65) Prior Publication Data
US 2016/0200359 A1   Jul. 14, 2016

(30) Foreign Application Priority Data
Aug. 29, 2013  (AT) .................................. A670/2013

(51) Int. Cl.
*B62D 15/02*   (2006.01)
(52) U.S. Cl.
CPC ......... *B62D 15/025* (2013.01); *B62D 15/027* (2013.01)
(58) Field of Classification Search
CPC . B62D 15/025; B62D 15/027; B62D 15/0285
See application file for complete search history.

(56) References Cited

U.S. PATENT DOCUMENTS

| | | | |
|---|---|---|---|
| 5,870,303 A | 2/1999 | Trovato | |
| 2004/0006423 A1* | 1/2004 | Fujimoto | G05D 1/0206 701/467 |

(Continued)

FOREIGN PATENT DOCUMENTS

| | | |
|---|---|---|
| CN | 101535115 A | 9/2009 |
| DE | 10 2012 211 721 | 6/2013 |
| EP | 0 375 055 | 6/1990 |

OTHER PUBLICATIONS

International Search Report for PCT/EP2014/067406, dated Jan. 21, 2014.

*Primary Examiner* — Redhwan k Mawari
*Assistant Examiner* — Anshul Sood
(74) *Attorney, Agent, or Firm* — Norton Rose Fulbright US LLP; Gerard Messina

(57) ABSTRACT

For steering a vehicle around obstacles, proceeding along a path from a starting position to an end position, the path including linear sub-paths which are defined by an increment $\eta$ and a steering angle $\delta$, a method includes: a) determining a maximum steering angle range and a maximum and a minimum increment range; b) determining the present distance $e_P$ from the end position, the target angle $\theta_O$, and the angle difference $e_\theta$ between the present vehicle angle and the target angle; c) performing an optimization method for ascertaining a sub-path by minimizing the value of a cost function $l_o$ assigned to the sub-path; d) determining the new position by adding the ascertained sub-path to the present position; and e) repeating steps (b) through (d) until the end position is reached.

12 Claims, 4 Drawing Sheets

(56) References Cited

U.S. PATENT DOCUMENTS

2012/0101654 A1* 4/2012 Samples ............... G08G 1/168
                                                      701/1
2013/0151060 A1* 6/2013 Lee .................. B62D 15/0285
                                                      701/25

* cited by examiner

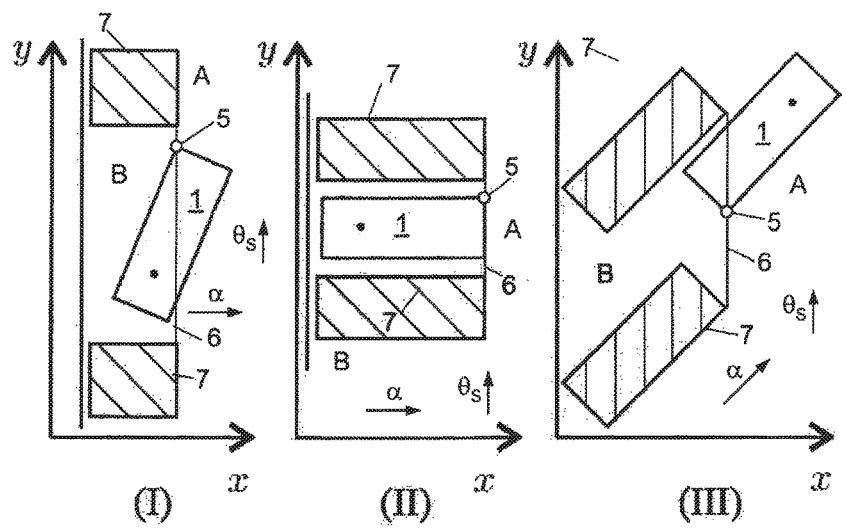
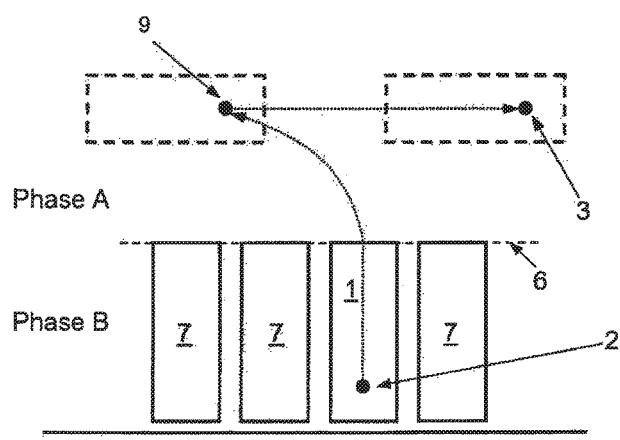
Fig. 3
Fig. 4

1: $\mathbf{q}_0 = \mathbf{q}_P$ {parking position}
2: $\theta_O = \alpha$ {target angle}
3: $r_\theta = r_{\theta_B}, \mathbf{R} = \mathbf{R}_B$ {weighting terms}
4: $D = 1$ {direction = forward}
5: $\mathbf{u}_0 = [u_{l_0}, \eta_0]^T$ {initial guess}
6: $l_{O_0} = \infty, i = 0$
7: repeat
8:    if $x_{C_{FL},i} \geq b$ then
9:       $\theta_O = \theta_S, r_\theta = r_{\theta_A}, \mathbf{R} = \mathbf{R}_A$
10:    end if
11:    $\mathbf{u}_i^* = \arg\min_{\mathbf{u}_i} l_{O_i}(\mathbf{q}_{i+1})$
12:      s.t.   $\mathbf{q}_{i+1} = \mathbf{f}(\mathbf{q}_i, \mathbf{u}_i, D)$
13:           $\mathbf{h}_P(\mathbf{q}_{i+1}) \leq 0$
14:           $\mathbf{u}_{min} \leq \mathbf{u}_i \leq \mathbf{u}_{max}$
15:    if $l_{O_i}^* > k_l l_{O_{i-1}}^*$ or  $\mathbf{h}_P(\mathbf{q}_{i+1}^*) > 0$ then
16:       $D = -D$
17:    else
18:       $\mathbf{q}_{i+1} \leftarrow \mathbf{f}(\mathbf{q}_i, \mathbf{u}_i^*, D)$
19:       $i \leftarrow i + 1$
20:    end if
21: until $\|\mathbf{q} - \mathbf{q}_S\| \leq \epsilon$

Fig. 5

METHOD FOR STEERING A VEHICLE

BACKGROUND OF THE INVENTION

1. Field of the Invention

The present invention relates to a method for steering a vehicle around obstacles, proceeding from a starting position to an end position, the vehicle being steered along a path.

2. Description of the Related Art

Methods are known from the related art for calculating the parking curve for pulling a vehicle into and out of a parking space or a garage. Such parking curves are used in automatic parking systems of vehicles to provide the driver with assistance when pulling into and out of a parking space or to carry out a fully automatic operation of pulling into or out of a parking space.

The German patent application publication DE 10 2012 211 721 A1, for example, shows a method for deriving a parking curve in which the vehicle is guided along linear sections and a single curve section having a constant turning radius in order to drive into the parking space. This publication also shows an improved method in which the vehicle is guided along a first straight extension line, a second straight extension line, and a third straight extension line.

However, what is problematic with such methods is that it must be established even before beginning the path planning how many linear or curved sections are to be used.

In other known methods, a mathematical optimization of the entire path is carried out, the path being parameterized by a composition made up of linear segments and curve segments.

Compared to manually pulling into or out of a parking space, however, such methods may only be used in limited cases and frequently fail in practice. The generally only limited computing capacity available in vehicles also creates narrow bounds with respect to the global optimization of the entire path.

BRIEF SUMMARY OF THE INVENTION

It is thus the object of the present invention to create a method for determining a path for pulling a vehicle into or out of a parking space which is simple, fast, taking the low computing capacity in vehicles into consideration, and nonetheless versatile enough to be reliably usable in practice.

This object is achieved according to the present invention in that the entire path is divided into linear sub-paths, which are each defined by an increment $\eta$ and a steering angle $\delta$, the method including the following steps:

Initially, a maximum steering angle range and a maximum and a minimum increment range are determined.

Thereafter, the present distance $e_P$ from the end position, the present vehicle target angle $\theta_O$, and the angle difference $e_\theta = \theta - \theta_O$ between the present vehicle angle $\theta$ and the target angle $\theta_O$ are established.

It is provided that the target angle $\theta_O$ may take on different values in different sections of the path.

Based on this information, an optimization method for ascertaining a sub-path by minimizing the value of a cost function $I_O$ assigned to the sub-path is carried out, the cost function including the present distance $e_P$ from the end position and the present angle difference $e_\theta$ as components which are weighted independently of each other. The cost function $I_O$ may also include further components, in particular as a function of the maximum steering angle range and increment range. The weighting of the individual terms in the cost function may be adapted to the particular scenario.

The result of the optimization is one sub-path, defined by one increment and one steering angle. The maximum steering angle range, the minimum and maximum increment ranges, and a collision test with the obstacles are provided as boundary conditions.

The new position, the distance from the end position and, if necessary, a new target angle and the new angle difference are determined after the optimization. The optimization and adaptation to the new values are repeated until the end position is reached with sufficient accuracy.

The optimization thus is not carried out globally for the entire path from the starting point to the end point, but separately for each individual sub-path. After a sub-path has been covered, a new optimization task is drawn up. Proceeding from the starting point, every sub-path is defined by one increment and one steering angle, a steering angle range being predefined, for example +/−45°. Moreover, a maximum and a minimum increment are predefined, for example a range from 1 mm to 20 cm.

In every individual optimization process, the minimum of a cost function is ascertained for ascertaining the increment and the steering angle, the components of the cost function being the present distance from the end point on the one hand, and the angle difference between the present vehicle angle and a target angle adapted to the particular scenario on the other hand. These two components are weighted independently of each other.

The increment and steering angle ranges and a collision detection based on the coordinates of the vehicle's outer edges and the obstacles serve as boundary conditions for the optimization. After the sub-path has been optimized, the new distance and angle from the end point and the difference from the vehicle angle are determined, and the optimization for the next sub-path continues until the end point is reached with sufficient accuracy. Compared to global optimizations of the entire path, this method requires considerably less computing power since the optimization is divided among multiple, typically 30 to 100, individual optimizations. No curve sections are required; instead, the entire path is composed of linear sub-paths.

According to the present invention, it may be provided that initially—with the vehicle stationary—the entire path to the end point is calculated, and only thereafter is the vehicle steered along the path.

However, it may also be provided that the vehicle is being steered along the calculated sub-paths already during the calculation of the path to the end point.

Moreover, it may be provided that the method is divided into at least two phases as a function of the position of one point of the vehicle, in particular one corner, relative to the obstacles, a target angle $\theta_O = \alpha$ being selected in a first section, $\alpha$ denoting the angle which is essentially normal to a boundary line between the obstacles.

That outer edge or outer corner of the vehicle may preferably be selected as the corner about which the vehicle must turn during the movement from the starting position to the end position in order to circumnavigate the obstacles. However, it is also possible to select other points on the vehicle.

By appropriately selecting the target angle $\theta_O$, which is essentially normal to a boundary line between the obstacles, it is achieved that the optimization method provides approaches which prefer a turn of the vehicle, and thus guide the vehicle preferably quickly around an obstacle, for example move it out of a parking space.

On the other hand, it may also be provided that a target angle is selected which is essentially parallel to the longitudinal extension of the obstacles. This selection is advantageous to preferably not turn the vehicle, but move it preferably quickly along a straight line, for example to attain the end position after leaving the parking space without excessive angular corrections.

The selection of the target angle is preferably adapted to the particular scenario.

For example, a target angle normal to a boundary line between the obstacles may be advantageous if the vehicle is to be moved out of a curb-side parking situation (parallel parking) or a cross parking situation (garage parking).

On the other hand, a target angle which is essentially parallel to the longitudinal extension of the obstacles may be advantageous if the vehicle is to be moved out of an angle parking situation.

According to the present invention, it may furthermore be provided that the method is divided into at least two phases as a function of the position of a corner of the vehicle relative to the obstacles, in a second phase a target angle $\theta_O = \theta_S$ being selected which is essentially parallel to a boundary line between the obstacles.

This may solve the case that the vehicle, in a first phase, is initially moved out of a parking space by a strong turning movement and thereafter, in a second phase, attains the end position preferably without any turning movement.

The differentiation between the respective phases is preferably carried out based on the position of one of, for example, four corners of the vehicle with respect to the obstacles, for example that corner about which the vehicle must turn the tightest to reach the end position. This corner may be determined in the initialization phase of the algorithm based on the measured sensor data, for example. The condition for the phase change, however, may also take place based on other criteria, in particular with respect to the position of a point of the vehicle in relation to a derived criterion of the obstacles, for example a very particular boundary line between the obstacles.

It is also possible to calculate a certain safety distance around the obstacles to safely avoid collisions and, for example, to counteract measuring errors with respect to the position and extension of the obstacles.

According to the present invention, it may be provided that the different phases each differ by different weighting factors of the optimization variables $e_P$ and $e_\theta$.

In one variant of the present invention, the method is divided into two phases A and B, in phase A the weighting of the present distance $e_P$ from the end position outweighing the weighting of the present angle difference $e_\theta$ to the target angle to quickly move the vehicle in the direction of the end position, in phase B the weighting of the angle difference $e_\theta$ to the target angle outweighing the weighting of the present distance $e_P$ from the end position to bring the vehicle into the correct angular position, a switch being carried out between phase A and phase B at a switching point as soon as the position of a corner of the vehicle passes through a boundary line between the obstacles.

However, situations in which more than two phases having different weighting factors are present are also provided according to the present invention, for example when additional obstacles are present in the surroundings of the end position which must be circumnavigated. The number of phases having different weighting factors is not limited according to the present invention.

According to the present invention, it may be provided that additionally points of change in direction are determined during the method, at which the direction of the sub-path to be determined is changed. The points of change in direction may be defined as those points at which either no sub-path is ascertainable whose associated cost function is improved compared to the previously ascertained sub-path, or no sub-path is ascertainable which is situated within the allowed increment range.

In particular, the points of change in direction may be defined as those points at which no sub-path is ascertainable in phase A whose associated cost function is improved compared to the previously ascertained sub-path, or no sub-path is ascertainable in phase B which is situated within the allowed increment range.

In this way, a driving behavior which resembles the human driver is emulated in that the present driving direction is reversed if no improvement in the position or no further movement without collision is possible in the present direction.

In addition to the method, the present invention also relates to a computer-readable data carrier including a computer program which implements a method according to the present invention, to a device for carrying out a method according to the present invention, including sensors for ascertaining the starting position, the end position, the vehicle angle, the steering angle and the coordinates of the obstacles, and a control unit, and to a vehicle including such a device.

BRIEF DESCRIPTION OF THE DRAWINGS

FIG. 3 shows a schematic representation of different parking scenarios.

FIG. 4 shows a schematic representation of one parking scenario.

FIG. 5 shows a representation of the method according to the present invention using pseudocode.

DETAILED DESCRIPTION OF THE INVENTION

Figure 1:
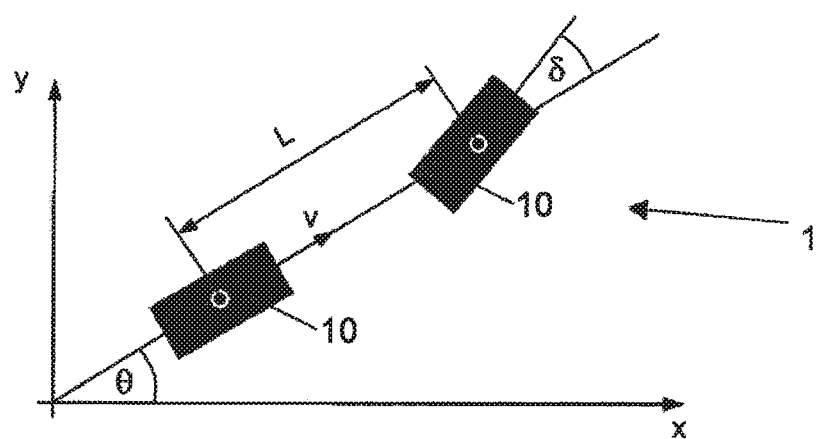
FIG. 1 shows a schematic outline of the kinematic model used for the vehicle.

FIG. 1 shows a schematic outline of the kinematic model used for the vehicle. Vehicle 1 (not shown) has a length $l_c$ and a width $w_c$, for example corresponding to the illustrated table, and is moving in the direction of vector v and initially has vehicle orientation θ with respect to the used coordinate system. The two wheels of one axis are combined here to each form an imaginary wheel 10 in the center of the axis, the front wheel having steering angle δ. The maximum steering angle in this exemplary embodiment is 45°. The distance between the two wheels is the corresponding wheelbase of vehicle L.

Figure 2A:
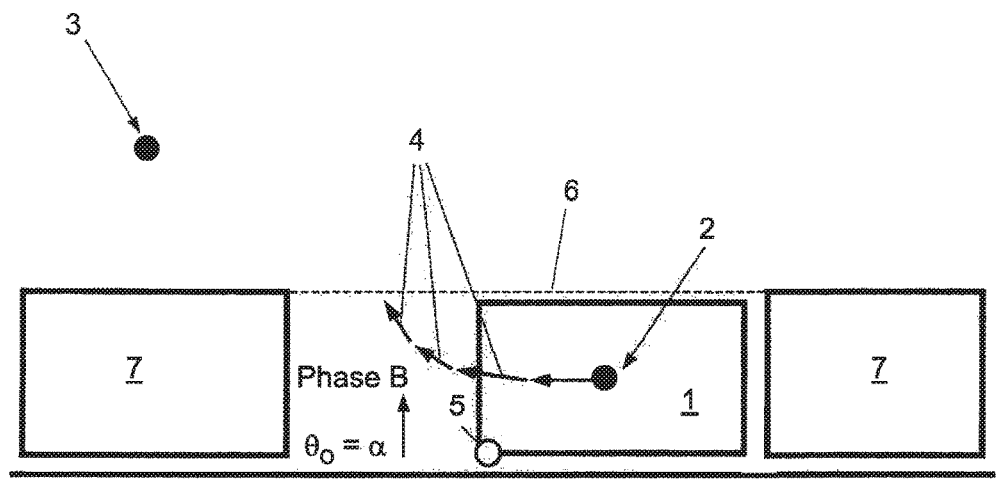
FIGS. 2a through 2b show schematic outlines of an operation of pulling a vehicle out of a parking space carrying out the method according to the present invention.

FIG. 2a shows a vehicle 1 which is in a starting position 2 and is to be steered into an end position 3 without coming in contact with obstacles 7. A number of sub-paths 4 are determined for this purpose, a static optimization problem being solved for each sub-path.

As a function of the position of a corner 5 of the vehicle relative to an imaginary boundary line 6 between obstacles 7, a distinction is made between phases A and B in which different weightings are used for the particular optimization method to be solved. In the illustrated case, vehicle 1 is in the parked state in phase B and is to be moved out of the parking space with preferably strong turning movements, without the absolute distance from end point 3 being of high importance. For this reason, target angle $\theta_O = \alpha$ is set in the optimization method, and the weighting of the distance from end position $e_P$ is drastically reduced compared to the weighting of the angle difference to target angle $e_\theta = \theta - \theta_O$.

Figure 2B:
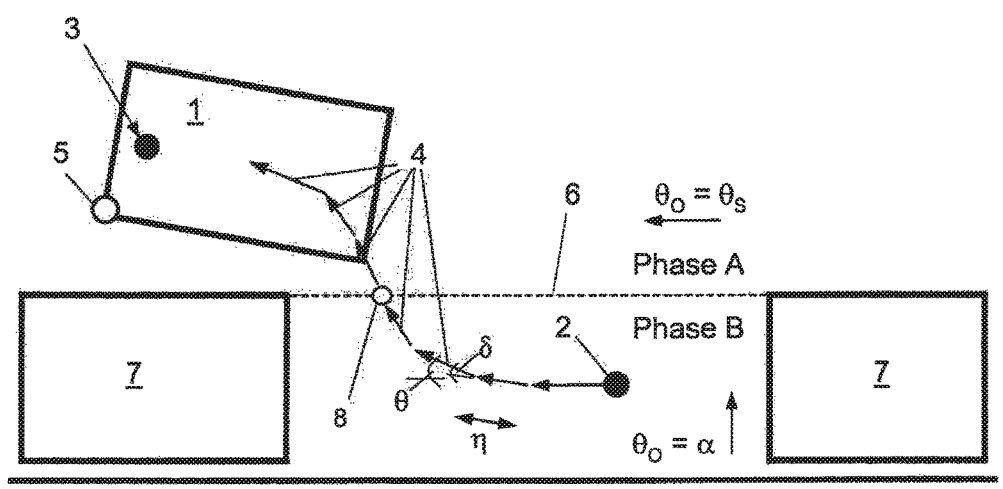

FIG. 2b shows vehicle 1 just prior to reaching end position 3. Corner 5 has traversed boundary line 6 at switching point 8, and a switch was made from phase B to phase A. Correspondingly, target angle $\theta_O = \theta_S$ was set in the optimization method, and the weighting of the distance from end position $e_P$ was drastically increased compared to the weighting of the angle difference to target angle $e_\theta$.

FIG. 3 schematically shows different scenarios of the method, namely parallel pulling into and out of a parking space or parallel parking (I), pulling into and out of a garage or cross parking (II), and angled pulling into and out of a parking space (III). In each scenario, a possible relevant corner 5 of the vehicle is marked, which may be used to determine the phase change between phase A and phase B. Other corners are also conceivable.

The range of phases A and B is also shown. In all three scenarios, target angle $\theta_S$ in phase A points in parallel to boundary line 6. In contrast, target angle $\alpha$ in phase B is normal to boundary line 6 in scenarios I and II, but in parallel to the longitudinal extension of obstacles 7 in scenario III.

FIG. 4 shows a schematic representation of a parking scenario in which the driving direction is changed. Proceeding from starting point 2, vehicle 1 initially moves out of a parking space and thus moves out of phase B into phase A. Thereafter, however, a situation occurs in which the vehicle moves further away from end point 3 by every forward movement.

Consequently no sub-path whose cost function is lower than the previously calculated cost function is ascertainable in the optimization method in phase A.

This situation is recognized at point of change in direction 9 at which the vehicle changes the driving direction and backs up. The vehicle consequently approaches end point 3 again. Of course it may also be necessary to change the driving direction multiple times during an operation of pulling into or out of a parking space to obtain results of the optimization method which are always valid and continuously reduced.

FIG. 5 shows a detailed representation of the method according to the present invention using pseudocode. In this exemplary embodiment, a method for pulling out of a parking space is carried out, and the starting position of vehicle $q_0$ is initialized as parking position $q_P$. Thereafter, target angle $\theta_O$ is set to value $\alpha$. The value of a depends on the particular parking situation. Both in the case of parallel parking and in the case of cross parking, the vehicle is to be moved normally to boundary line 6 if possible for the operation of pulling out of the parking space.

Thereafter, weight term $r_\theta$ and weight matrix R are set. Depending on the phase, the initial values $r_\theta$, $\theta_O$ and R are set as follows, for example, it also being possible, of course, for other weightings to be provided:

|  | Phase A | Phase B |
| --- | --- | --- |
| $r_\theta$ | 4 | 1 |
| $\theta_O$ | $\theta_S$ | $\alpha$ |
| R | $\begin{pmatrix} 30 & 0 \\ 0 & 1 \end{pmatrix}$ | $\begin{pmatrix} 0.1 & 0 \\ 0 & 0 \end{pmatrix}$ |

In the present exemplary embodiment, an operation for pulling out of a parking space is determined; the method is thus initially in phase B. Direction D of the vehicle is initialized with 1 (forward) and starting solution $u = [u_{l0}, \eta^0]^T$ for steering input $u_l = 1/L \tan(\delta)$ and increment $\eta$. Vectors $u_{min}$ and $u_{max}$ limit the steering input and the increment.

Thereafter, the optimization method is run through in a loop until the position of the vehicle is in an epsilon surroundings around the end point and thus the end position has been reached.

It is checked in every passage of the loop whether the position of corner 5 passes through the imaginary boundary line of the obstacles ($x_{CFI,i} \geq b$), and in this case the weighting terms of phase A from above the table are used.

Thereafter, the actual optimization method is started, which is defined as follows:

$$\min_{u_i} \; l_{O_i}(q_{i+1})$$

$$\text{s.t.} \; q_{i+1} = f(q_i, u_i, D)$$

$$h_P(q_{i+1}) \leq 0$$

$$u_{min} \leq u_i \leq u_{max},$$

the cost function to be minimized reading:

$$l_{O_i}(q_{i+1}) = T \theta e_{\theta_{i+1}}^2 + e_{P_{i+1}}^T R e_{P_{i+1}}.$$

In this method, $q_i$ denotes the present position of the vehicle in relation to step i, $u_i$ denotes the increment vector, and D denotes the direction. The cost function is minimized with respect to variables $e_{\theta i}$ and $e_{Pi}$. The term $e_{Pi} = [x_i - x_s, y_i - y_s]^T$ denotes the distance between the vehicle and starting position $[x_s, y_s]$ at step i (since the entire path is calculated backward from the end position to the starting position). The term $e_{\theta i} = \theta_i - \theta_O$ denotes the difference between the present vehicle angle and target angle $\theta_O$. Parameters $r_\theta$ and R are weighting parameters.

The function $h_P(q_i)$ denotes a collision detection which detects a contact of the given dimensions of the vehicle with the obstacles on the geometric path. Finally, $u_{min}$ and $u_{max}$ denote the minimum and maximum values of the optimization variables made up of the steering input and the increment.

In every iteration step, the position and the vehicle angle are improved with respect to the cost function, the cost function fulfilling the purpose of allowing the starting point to be reached rapidly by selecting defined weighting parameters $r_\theta$ and R in phases A and B.

New position $q_{i+1}$ is represented by a movement equation $f(q_i, u_i, D)$, which reads $$q_{i+1} = \begin{pmatrix} x_{i+1} \\ y_{i+1} \\ \theta_{i+1} \end{pmatrix}$$

$$= \begin{pmatrix} x_i + D\eta_i \cos\left(\theta_i + D\frac{\eta_i u_{l_i}}{2}\right) \\ y_i + D\eta_i \cos\left(\theta_i + D\frac{\eta_i u_{l_i}}{2}\right) \\ \theta_i + D\eta_i u_{l_i} \end{pmatrix}$$

$$= f(q_i, u_i, D)$$

The optimization problem of cost function $l_{Oi}(q_i)$ is always formulated only for one incremental step after another and is repeated until the end point is reached. After every optimization, it is checked whether either the value of the cost function is greater than in the preceding optimization ($l_{Oi}^* > k_i \cdot l_{Ol-1}^*$) or a collision takes place ($h_P(q_{i+1}^*)>0$) and thus no sub-path was found. Here, $k_l$ denotes a weighting factor to also allow sufficiently small degradations. If this is the case, the direction of the sub-path is reversed by equating D to –D.

Otherwise, new position $q_{i+1}$ is ascertained with the aid of movement equation $f(q_i, u_i, D)$, and the method is continued with the new position. The method is ended when the new position is in an epsilon surroundings around the end point.

The method according to the present invention may be part of control electronics of a vehicle or be present in the form of a computer program on a data carrier. The accordingly steered vehicle is equipped with sensors for detecting the surroundings, and preferably also the host vehicle's driving movements. A GPS sensor and multiple ultrasonic sensors or cameras may be provided, for example, to detect the host vehicle's position and the positions of the obstacles. Based thereon, it is possible to determine the required weighting terms for the method.

What is claimed is:

1. A method for steering a vehicle around at least one obstacle, the vehicle being steered along a path extending from a starting position to an end position, wherein the path includes multiple linear sub-paths which are each defined by an increment $\eta$ and a steering angle $\delta$, the method comprising:
    a) determining a maximum steering angle range, a maximum increment range, and a minimum increment range;
    b) determining a present distance $e_P$ from the end position, a target angle $\theta_O$, and an angle difference $e_\theta$ between a present vehicle angle $\theta$ and the target angle $\theta_O$;
    c) carrying out an optimization method for ascertaining a linear sub-path by minimizing the value of a cost function $l_O$ assigned to the linear sub-path, wherein:
        (i) the cost function includes the present distance $e_P$ from the end position and the present angle difference $e_\theta$ to the target angle as optimization variables which are weighted independently of each other, and
        (ii) the maximum steering angle range, the maximum increment range, the minimum increment range, and a collision test are provided as boundary conditions;
    d) determining a new position by adding the ascertained linear sub-path to the present position; and
    e) repeating steps (b) through (d) until the end position is reached
    f) steering the vehicle along the path in accordance with at least one of the ascertained linear sub-paths.

2. The method as recited in claim 1, wherein the entire path to the end point is initially calculated, and subsequently the vehicle is steered along the path.

3. The method as recited in claim 1, wherein the vehicle is steered along the calculated linear sub-paths during the calculation of the overall path to the end point.

4. The method as recited in claim 1, wherein the method is divided into at least two phases as a function of the position of one corner of the vehicle relative to at least two obstacles, a target angle $\theta_O = \alpha$ which is essentially normal to a boundary line between the at least two obstacles being selected in a first phase.

5. The method as recited in claim 4, wherein the at least two phases differ by weighting factors of the optimization variables.

6. The method as recited in claim 5, wherein the method is divided into two phases A and B, and wherein:
    a) in phase A, the weighting of the present distance $e_P$ from the end position outweighs the weighting of the angle difference $e_\theta$ to the target angle to quickly move the vehicle in the direction of the end position;
    b) in phase B, the weighting of the angle difference $e_\theta$ to the target angle outweighs the weighting of the distance $e_P$ from the end position to bring the vehicle into the correct angular position; and
    c) a switch is carried out between phase A and phase B at a switching point as soon as the position of one corner of the vehicle passes through a boundary line between the at least two obstacles.

7. The method as recited in claim 6, wherein, during the optimization method, points of change in direction are determined at which the direction of the sub-path to be determined is changed, the points of change in direction being defined as points at which one of:
    a) in phase A, no sub-path is ascertainable whose associated cost function is improved compared to the previously ascertained sub-path; or
    b) in phase B, no sub-path is ascertainable which is within the allowed increment range.

8. The method as recited in claim 5, wherein, during the optimization method, points of change in direction are determined at which the direction of the sub-path to be determined is changed, the points of change in direction being defined as points at which one of:
    a) no sub-path is ascertainable whose associated cost function is improved compared to the previously ascertained sub-path; or
    b) no sub-path is ascertainable whose increment is within the allowed increment range.

9. The method as recited in claim 1, wherein the method is divided into at least two phases as a function of the position of one corner of the vehicle relative to at least two obstacles, a target angle $\theta_O = \alpha$ which is essentially parallel to the longitudinal extension of the at least two obstacles being selected in a first phase.

10. The method as recited in claim 1, wherein the method is divided into at least two phases as a function of the position of one corner of the vehicle relative to at least two obstacles, a target angle $\theta_O = \theta_S$ which is essentially parallel to a boundary line between the at least two obstacles being selected in a second phase.

11. A non-transitory, computer-readable data storage medium storing a computer program having program codes which, when executed on a computer, perform a method for steering a vehicle around at least one obstacle, the vehicle being steered along a path extending from a starting position to an end position, wherein the path includes multiple linear sub-paths which are each defined by an increment η and a steering angle δ, the method comprising:
  a) determining a maximum steering angle range, a maximum increment range, and a minimum increment range;
  b) determining a present distance $e_P$ from the end position, a target angle $\theta_O$, and an angle difference $e_\theta$ between a present vehicle angle θ and the target angle $\theta_O$;
  c) carrying out an optimization method for ascertaining a linear sub-path by minimizing the value of a cost function $l_O$ assigned to the linear sub-path, wherein:
    (i) the cost function includes the present distance $e_P$ from the end position and the present angle difference $e_\theta$ to the target angle as optimization variables which are weighted independently of each other, and
    (ii) the maximum steering angle range, the maximum increment range, the minimum increment range, and a collision test are provided as boundary conditions;
  d) determining a new position by adding the ascertained linear sub-path to the present position; and
  e) repeating steps (b) through (d) until the end position is reached
  f) steering the vehicle along the path in accordance with at least one of the ascertained linear sub-paths.

12. A control system for steering a vehicle around at least one obstacle, the vehicle being steered along a path extending from a starting position to an end position, wherein the path includes multiple linear sub-paths which are each defined by an increment η and a steering angle δ, the control system comprising:
  a detection system including sensors for ascertaining the starting position, the end position, the steering angle δ, the vehicle angle θ, and the coordinates of the at least one obstacle; and
  a control unit including a processor configured to perform the following:
  a) determining a maximum steering angle range, a maximum increment range, and a minimum increment range;
  b) determining a present distance $e_P$ from the end position, a target angle $\theta_O$, and an angle difference $e_\theta$ between a present vehicle angle θ and the target angle $\theta_O$;
  c) carrying out an optimization method for ascertaining a linear sub-path by minimizing the value of a cost function $l_O$ assigned to the linear sub-path, wherein:
    (i) the cost function includes the present distance $e_P$ from the end position and the present angle difference $e_\theta$ to the target angle as optimization variables which are weighted independently of each other, and
    (ii) the maximum steering angle range, the maximum increment range, the minimum increment range, and a collision test are provided as boundary conditions;
  d) determining a new position by adding the ascertained linear sub-path to the present position; and
  e) repeating steps (b) through (d) until the end position is reached
  f) steering the vehicle along the path in accordance with at least one of the ascertained linear sub-paths.

* * * * *